United States Patent [19]

Zbinden et al.

[11] Patent Number: 5,531,496
[45] Date of Patent: Jul. 2, 1996

[54] AUTOMOTIVE GLASS ENCLOSURE RETAINING FIXTURE

[75] Inventors: Lyn R. Zbinden, Troy; Robert Dallos, Jr., Canton; Rodney G. Dick, Auburn Hills, all of Mich.

[73] Assignee: Saturn Corporation, Troy, Mich.

[21] Appl. No.: 281,817

[22] Filed: Jul. 28, 1994

[51] Int. Cl.[6] .................................................. B60J 1/04
[52] U.S. Cl. ........................ 296/96.21; 296/201; 52/208
[58] Field of Search .......................... 296/96.21, 201; 52/208, 204, 591

[56] References Cited

U.S. PATENT DOCUMENTS

| 4,249,356 | 2/1981 | Noso | 296/96.21 X |
|---|---|---|---|
| 4,561,689 | 12/1985 | Sprenger | 296/84 A |
| 4,606,159 | 8/1986 | Kunert | 52/208 |
| 4,659,138 | 4/1987 | Gösse et al. | 296/96.21 X |
| 4,779,919 | 10/1988 | Muller | 296/201 |
| 4,912,895 | 4/1990 | Harris, Jr. | 296/96.21 X |
| 4,986,595 | 1/1991 | Gold | 296/201 |
| 4,998,711 | 3/1991 | Borg | 269/21 |
| 5,152,576 | 10/1992 | Ris | 296/201 |
| 5,310,240 | 5/1994 | Ardre et al. | 296/96.21 X |

FOREIGN PATENT DOCUMENTS

| 404622 | 12/1990 | European Pat. Off. | 296/96.21 |
|---|---|---|---|
| 2697335 | 4/1994 | France | 296/96.21 |
| 3333672 | 4/1985 | Germany | 296/96.21 |
| 3442299 | 2/1986 | Germany | 296/96.21 |
| 110522 | 5/1987 | Japan | 296/96.21 |

Primary Examiner—Joseph D. Pape
Attorney, Agent, or Firm—Ernest E. Helms

[57] ABSTRACT

A glass positioning fixture for retaining a glass enclosure in place while the glass enclosure is being adhesively joined to an automotive frame is provided which in one preferred embodiment includes a base which includes a platform with a projecting compliant hook extending therefrom, the hook having a width generally larger than an insertion aperture provided in the frame and the hook expanding outwardly, permanently pivotally joining the base with the frame after insertion into the aperture, the base also having facing channel sides connected to the platform, the channel sides having a series of apertures; and a linear slider having a main body captured adjacent the platform and held by the channel sides and having a curvilinear head for contact with the glass enclosure, the slider also having peripheral sides with protrusions for selective engagement in the holes of the channel to allow bidirectional incremental adjustment of the slider with respect to the base, thereby positioning the glass enclosure.

1 Claim, 5 Drawing Sheets

1

AUTOMOTIVE GLASS ENCLOSURE RETAINING FIXTURE

FIELD OF THE INVENTION

The present invention relates to the mounting of a glass enclosure on a vehicle body and more particularly provides an adjustable support for supporting a lower edge of the windshield panel.

BACKGROUND OF THE INVENTION

It is well known to mount a window or windshield glass enclosure within a frame opening of a vehicle body by applying a bead of adhesive which acts between the inner face of the windshield panel and a flange on the vehicle body. As the adhesive is curing, the weight of the windshield may cause the windshield to slide downwardly. Therefore, it is necessary to support the weight of the windshield while the adhesive cures.

Prior to the present invention, adjustable supports were mounted on the vehicle body at the lower edge of the windshield opening for engaging an edge of the windshield to support the weight of the windshield panel.

Prior windshield holding fixtures are shown and described in U.S. Pat. Nos. 4,659,138; 4,561,689; 4,606,159; 4,779,919; 4,986,595; 4,998,711 and 5,152,576.

SUMMARY OF THE INVENTION

The present invention provides a holding fixture for a glass enclosure which is adhesively joined to the vehicle frame which is an alternative to the above-referenced patents, tending to be less expensive and additionally in one embodiment allowing for bidirectional adjustment.

DESCRIPTION OF THE PREFERRED EMBODIMENTS

Figure 1:
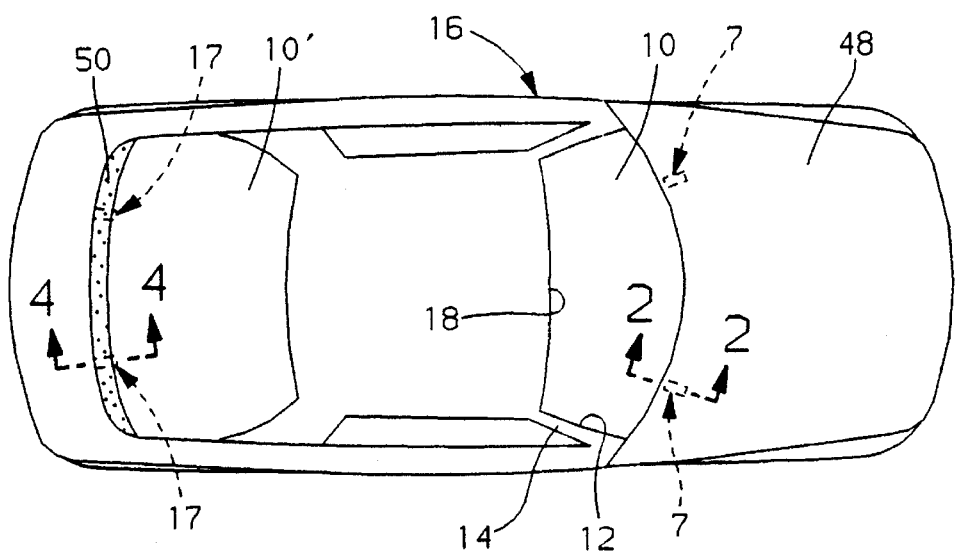
FIG. 1 is a top plan view of a preferred embodiment of the present invention illustrating the invention being utilized in its operative environment of holding a front and rear windshield of an automotive vehicle.
Figure 2:
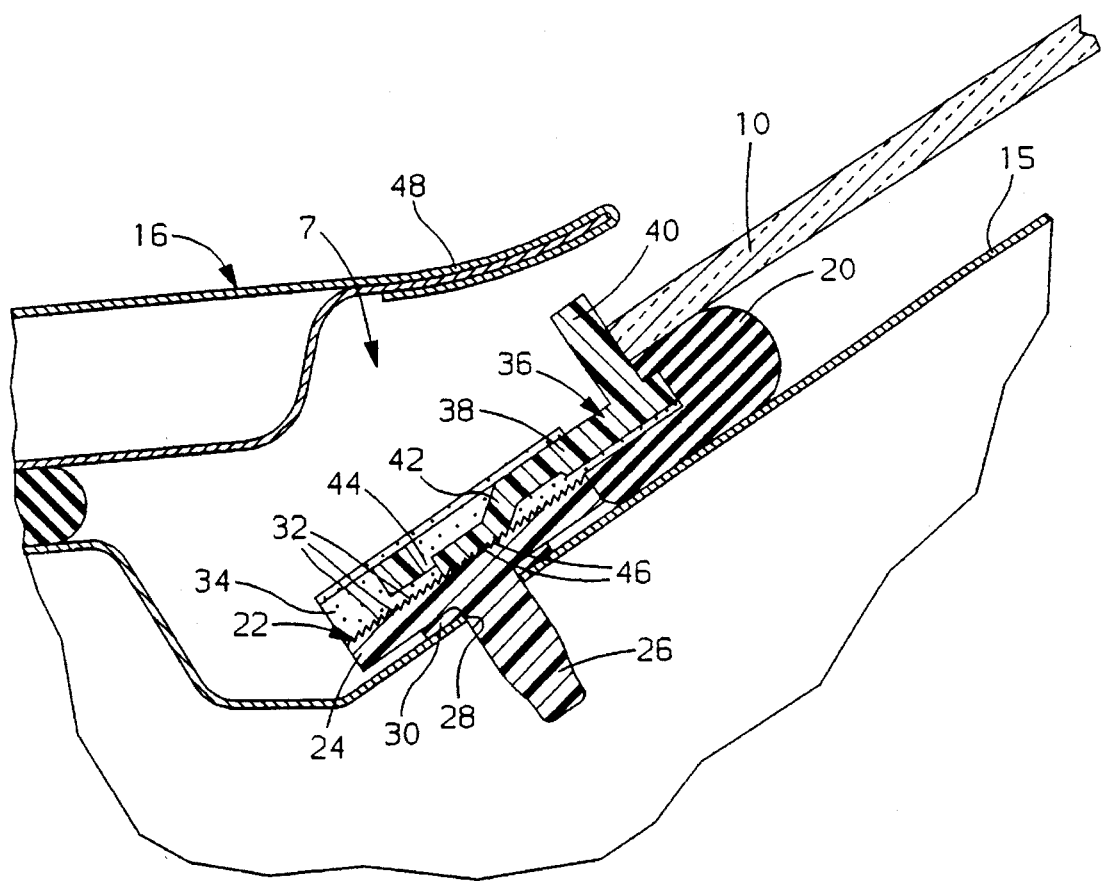
FIGS. 2 and 4 are enlarged sectional views taken along lines 2—2 and 4—4, respectively, of FIG. 1.
Figure 3:
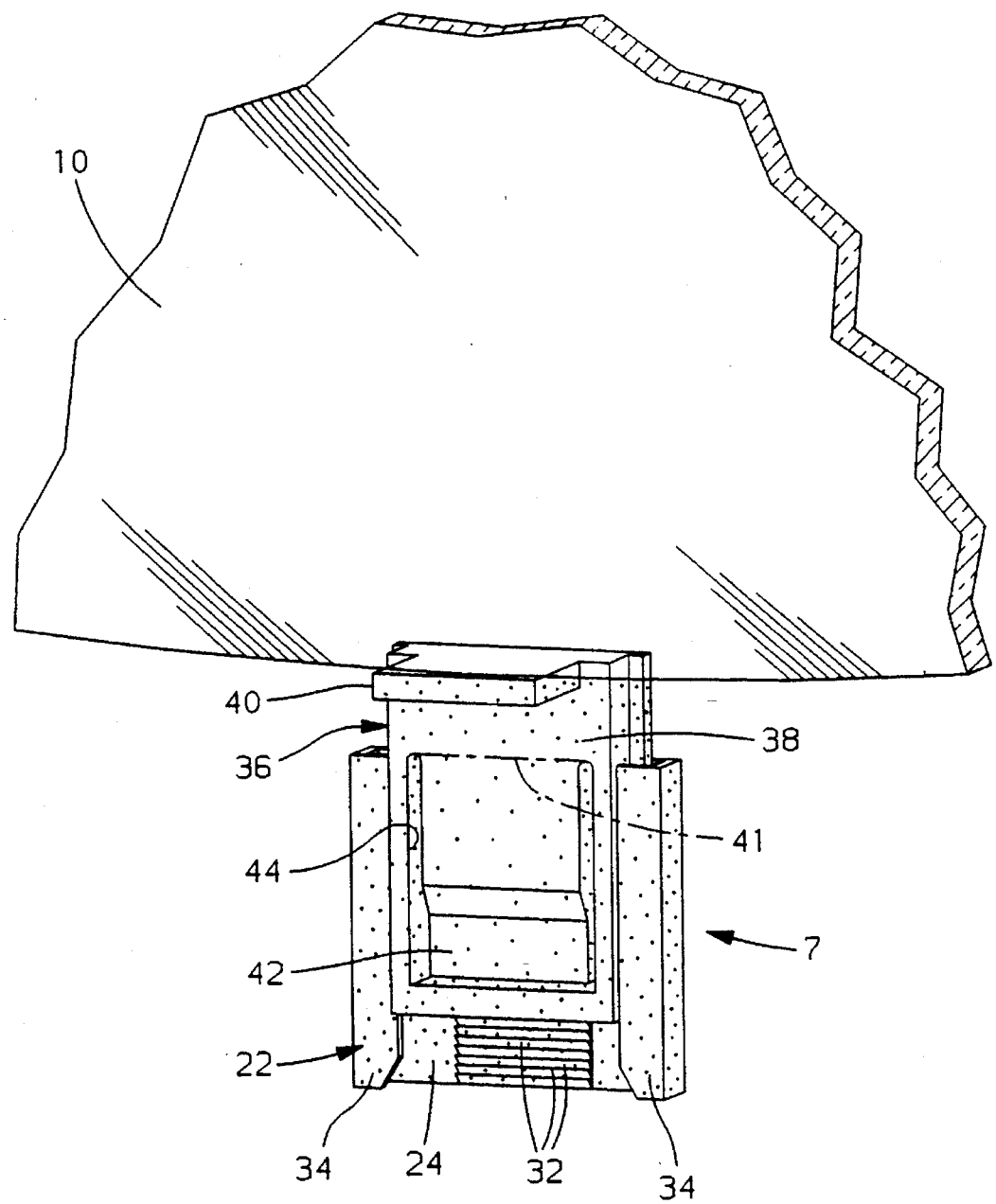
FIGS. 3 and 5 are front perspective views of the fixtures shown in FIGS. 2 and 4, respectively.

Referring to FIGS. 1 through 3, the glass retainer fixture 7 is illustrated retaining a front windshield glass enclosure 10 in position. The glass enclosure 10 is being positioned over a frame opening 12 formed in a frame 14 of an automotive vehicle 16. The frame opening 12 has an encircling flange 15. A top edge 18 of the opening 12 is utilized as an indexing or reference point to position the windshield 10. The windshield 10 will be adhesively and sealingly joined to the flange 15 by a sealant 20, typically polyurethane sold under the trade name Betaseal. The sealant 20 takes approximately 30 minutes to cure before the windshield 10 is held rigidly in position. Until such time, the two front fixtures 7 must maintain the windshield 10 in position.

2

The fixture 7 has two main members, the first one being a base 22. The base 22 has a platform 24. Platform 24 has a compliant projecting hook 26. The hook 26 (best illustrated in an alternative embodiment of FIG. 8) has a free state which is slightly larger than an aperture 28 provided in the flange 15. Upon insertion into the aperture 28, the hook 26 expands outwardly, permanently pivotally joining the platform 24 with the flange 15. As shown in FIG. 2, the hook is integral with the platform 22, but in another embodiment (not shown) the hook can have a connected head member and a shank of the hook can be inserted into an aperture in the platform 24 which is aligned with the aperture 28 of the flange 15. The platform 24 and the hook 26 are fabricated from a polymer such as nylon or acetal or other suitable alternatives. Surrounding the hook 26 adjacent the platform is a closed cell neoprene or nitrile foam washer 30. The washer 30 prevents any moisture from passing through the aperture 28 around the hook 26.

The platform 24 has a series of ratchet surfaces or teeth 32. Joined to the platform 24 are two channel sides 34 which have open ends facing one another. Captured adjacent the platform 24 by the channels 34 is a linear slider 36. The slider 36 has a main body 38. Joined to the main body 38 is a head 40 for contacting the windshield 10.

The slider 36 has a finger 42 formed by a generally U-shaped slot 44. The finger 42 on a side adjacent the ratchet teeth 32 on the platform has its own ratchet teeth 46 (best shown in FIG. 2). The finger 42 has a portion 41 where it is joined to the main body 38 of the slider.

As shown in FIG. 3, the slot 44 which is U-shaped is generally oriented upward, and the finger 42 joins the main body 38 at line 41 on the end of the slider closest to the head 40. In an embodiment not shown, the slot 44 could be inverted with portion 41 which joins the finger to the main body 38 at the end of the slider opposite the head 40.

Figure 4:
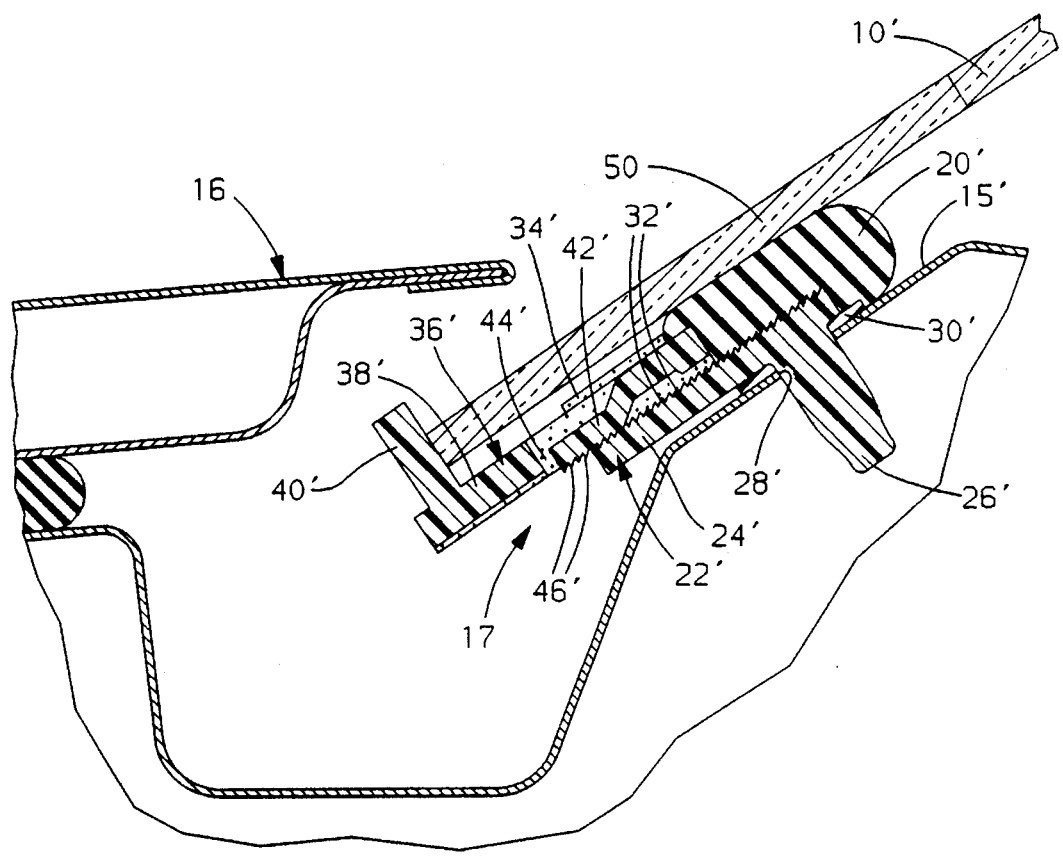
Figure 5:
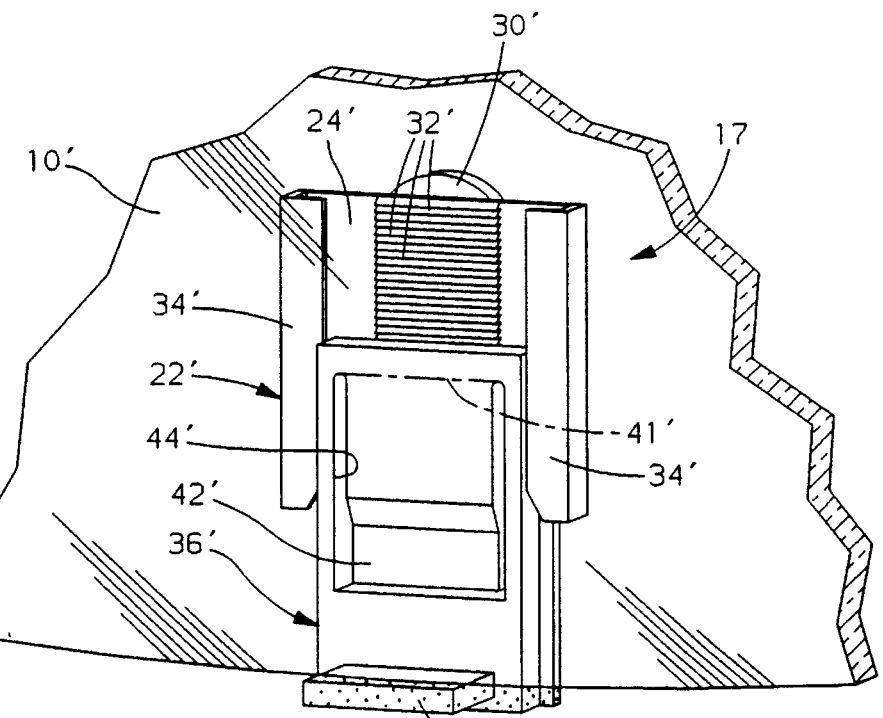

If desired, a from end of the from hood 48 can be built to extend more rightwardly as shown in FIG. 2 to conceal the placement of fixture 7 on the vehicle. Referring additionally to FIGS. 4 and 5, a fixture 17 for the rear windshield is illustrated. Elements common to both the above-described fixture 7 and fixture 17 according to this invention which are, except as described below, structurally or functionally similar are identified by primed reference characters in FIGS. 4 and 5. The fixture 17 is hidden from view due to a portion 50 of the rear windshield, which is given a blackened border.

Figure 6:
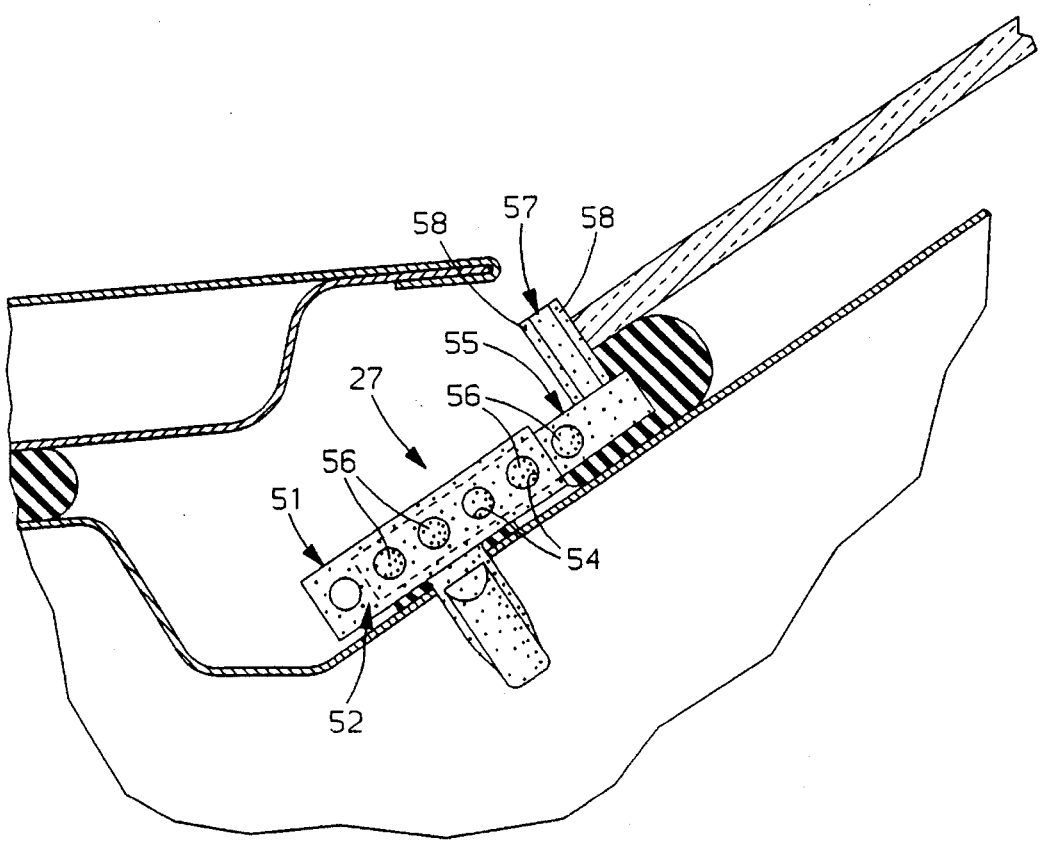
FIGS. 6 and 7 are views similar to those shown in FIGS. 2 and 4 of alternative preferred embodiments of the present invention.
Figure 7:
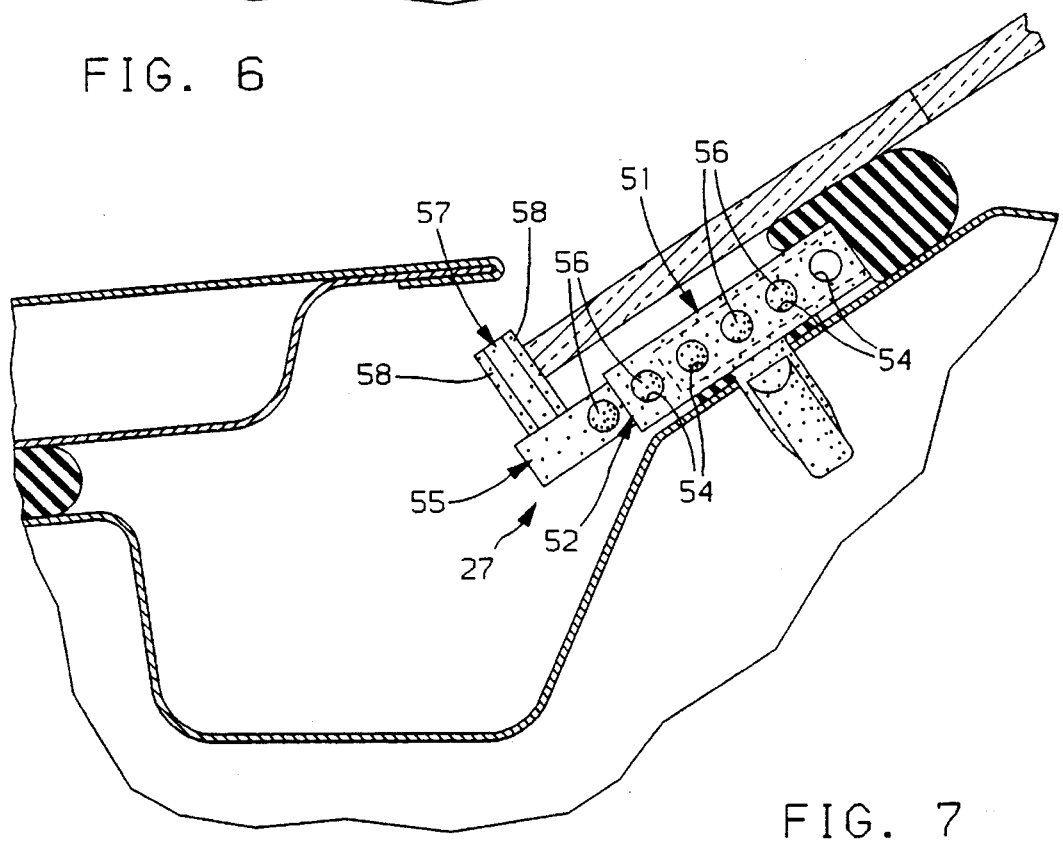
Figure 8:
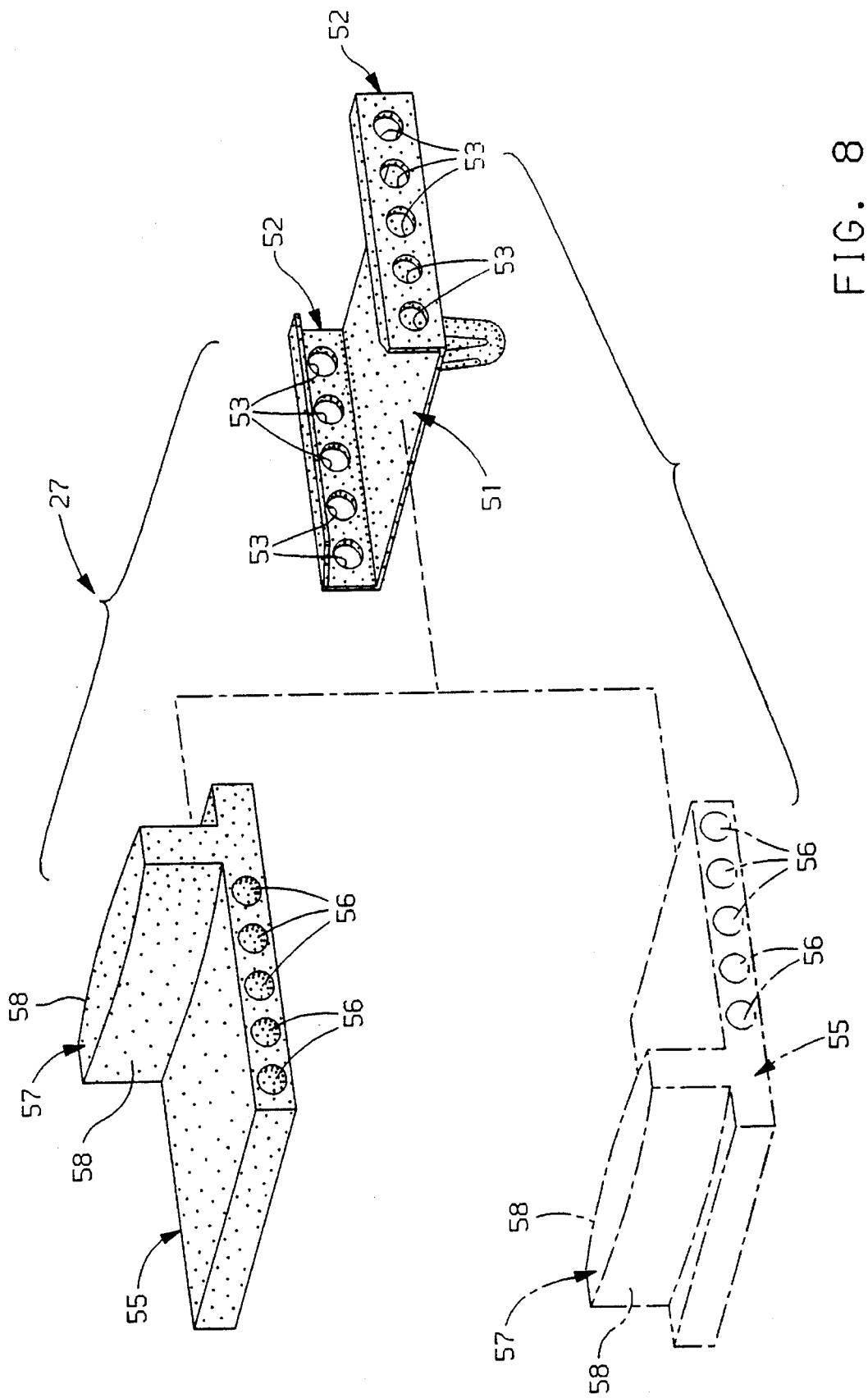
FIG. 8 is an exploded view of the fixtures shown in FIGS. 6 and 7.

Referring to FIGS. 6, 7 and 8, an alternate preferred embodiment of the present invention is shown. Items performing similar functions to those shown in FIGS. 2 and 4 are given similar reference numerals. In the fixture 27, the base and slider for both the front and rear windshields are identical. The base 51 has two channel sides 52 with a series of spaced circular apertures 53. The slider 55 has a series of partial spherical protrusions 56 for engagement with the apertures 53 to set the relative position of the slider 55 with respect to the base 51. The head 57 has two arched surfaces 58 to aid in the elimination of sharp points in contact with the edge of the glass enclosures. A major advantage of the embodiment 27 is that it can be used for the front or rear windshields. The embodiment 27 may be made from any suitable plastic, preferably nylon or acetal. The typical diameter for the holes 53 and protrusions 56 is 2.1 mm and 2.2 mm, respectively. The weight retention of the fixture 27 is approximately 5 lbf. The pressure required to adjust the fixture should be under 6 lbf. per square inch.

Another major advantage of this design is that adjustment is unilateral. Therefore, if the operator has pushed the slider 55 too far forward, the operator can easily reverse it in order to optimize the position of the glass enclosure.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A glass positioning fixture for retaining a glass enclosure in place while the glass enclosure is being adhesively joined onto an automotive frame, the fixture comprising:

a base, the base including a platform and a projecting compliant hook, the hook having a width generally larger than an insertion aperture provided in the frame and the hook expanding outwardly, permanently pivotally joining the base with the frame after insertion into the aperture, the base also having first ratchet teeth and facing channel lateral sides; and a linear slider, the slider having a main body captured adjacent the platform and held by the channel sides, the slider having a head for contact with the glass enclosure and the slider having a U-shaped slot providing a compliant finger with second ratchet teeth to interface with the first ratchet teeth, allowing the slider to be incrementally linearly adjustable with respect to the base to position and hold the glass enclosure.

* * * * *